June 13, 1961   W. M. SUPINGER   2,988,225
FILTER SYSTEM AND CARTRIDGE
Filed Aug. 18, 1958   4 Sheets-Sheet 1

INVENTOR.
W.M. SUPINGER
BY
S. Tierney, Jr
ATTORNEY

INVENTOR.
W.M. SUPINGER
BY S. Tierney, Jr
ATTORNEY

June 13, 1961 W. M. SUPINGER 2,988,225
FILTER SYSTEM AND CARTRIDGE
Filed Aug. 18, 1958 4 Sheets—Sheet 3

INVENTOR.
W.M. SUPINGER
BY S. Tierney, Jr.
ATTORNEY

June 13, 1961 W. M. SUPINGER 2,988,225
FILTER SYSTEM AND CARTRIDGE
Filed Aug. 18, 1958 4 Sheets-Sheet 4

INVENTOR.
W.M.SUPINGER
BY S. Tierney, Jr.
ATTORNEY

United States Patent Office 2,988,225
Patented June 13, 1961

2,988,225
FILTER SYSTEM AND CARTRIDGE
William M. Supinger, 2806 Fairmont Ave.,
San Diego, Calif.
Filed Aug. 18, 1958, Ser. No. 755,616
4 Claims. (Cl. 210—439)

This invention relates to a means for filtering fluids which contain small particles of foreign material such as the lubricating oils used in internal combustion engines as, for example, gasoline, gas and diesel engines.

One object of the invention is to provide a filter cartridge having a cylindrical hollow thin casing with its axis disposed vertically and having circular top and bottom covers hermetically sealed to the ends of the casing, a hollow tube within the casing and concentric therewith, and a cylindrical body of fibrous filter material filling the space between the central tube and casing so that liquid to be filtered introduced into the bottom of the casing will travel up through the filter material and have the particles of foreign matter removed therefrom.

Another object is to provide a seal in contact with the lower end of the central tube and the lower casing cover which prevents the liquid in the bottom of the casing from passing directly into the lower end of the central tube and thus not being filtered.

A further object is to provide a seal between the top of the central tube and the top cover of the casing which will prevent the filtered liquid from escaping at the joint between these two members.

Another object is to so shape and arrange the aforesaid seals that they help to position and hold the cartridge symmetrical and coaxial with respect to a central pipe partly disposed within the cartridge assembly and which serves to carry away the liquid which has passed through the filter material.

A further object is to provide means between the filter material and the bottom cover which prevents the filter material from lodging against the bottom cover which would prevent the free flow of the unfiltered liquid to the entire lower end of the filter material. The preferred means maintains a clear space between the filter material and the bottom cover through which the unfiltered liquid introduced into the space can pass freely to all portions of the filter material at its lower end.

Another object is to provide means between the filter material and the top cover of the cartridge which will provide a continually open passage between these members and through which the filtered liquid can flow freely to a set of holes through the hollow tube near its top, these holes serving as the outlet of the cartridge.

Another object is to stabilize and support the body of filter material against movement in the casing by means of a set of spaced apart cylindrical wire screens embedded in the filter material which is preferably compressed into interlocking engagement with the meshes of the wire.

A still further object is to provide a sealed hollow enclosing housing in which the upper and lower filters are mounted and suitable connections to conduct liquid containing particles of foreign material from a supply or storage container into the housing in such a manner that all the liquid entering the housing passes substantially radially inward through the lower filter which removes most of the foreign particles therefrom and then passes upward through the upper filter which removes the remaining particles, the top portion of the housing having an outlet through which the filtered liquid is discharged and conveyed to the site of use or the container.

Another object is to provide in association with the aforesaid housing and its enclosed filters suitable conduit connections whereby only a portion of the liquid which has passed through the lower filter passes upward through the upper filter which completes the filtering, the remaining portion of the liquid being conveyed to the site of use as, for example, the bearings of an internal combustion engine.

Other objects will become apparent as the description of the invention proceeds. For a better understanding of the invention, reference is made to the accompanying drawings, in which.

Figure 2:
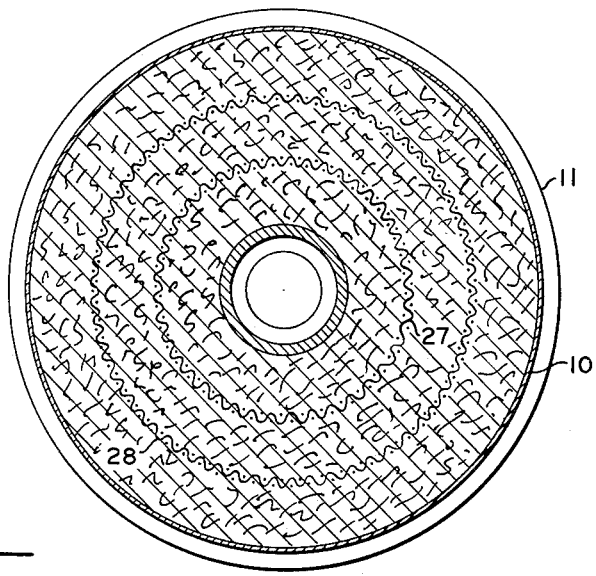
FIG. 2 is a section on line 2—2 of FIG. 1.
Figure 1:
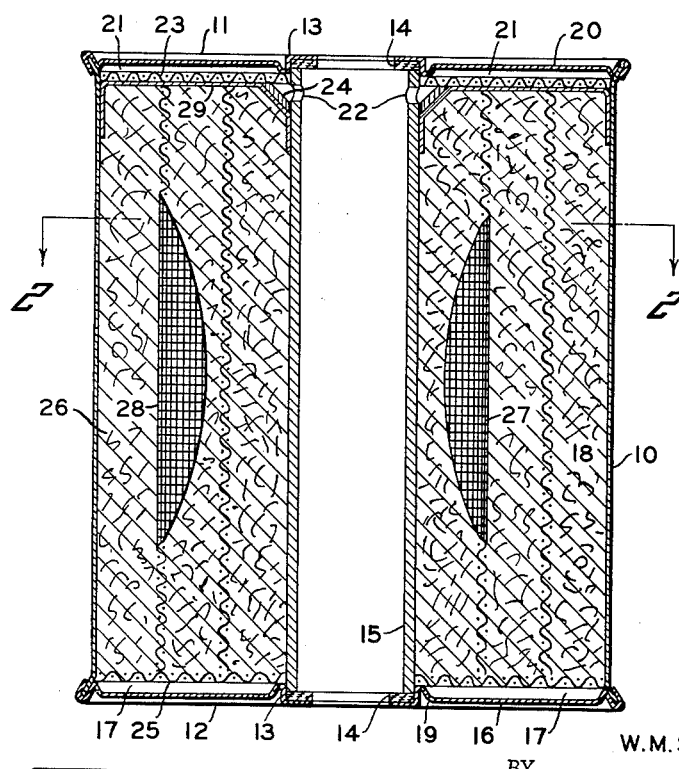
FIG. 1 is a longitudinal section of a filter cartridge embodying the invention and portions of screens therein broken away.
Figure 3:
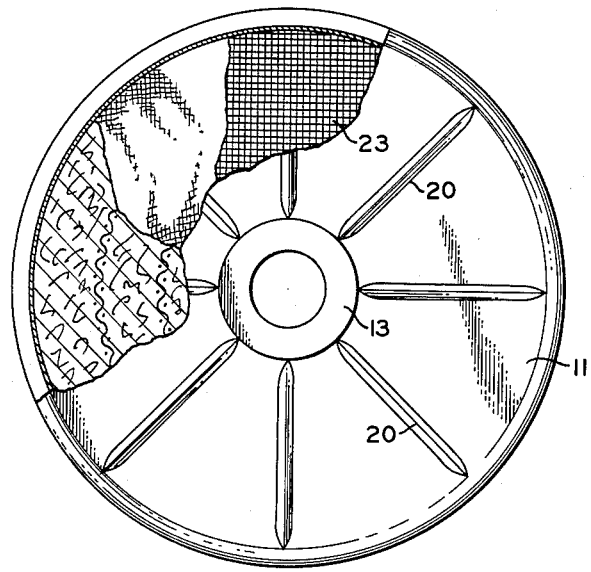
FIG. 3 is a top view with portions broken away of the cartridge of FIG. 1.
Figure 4:
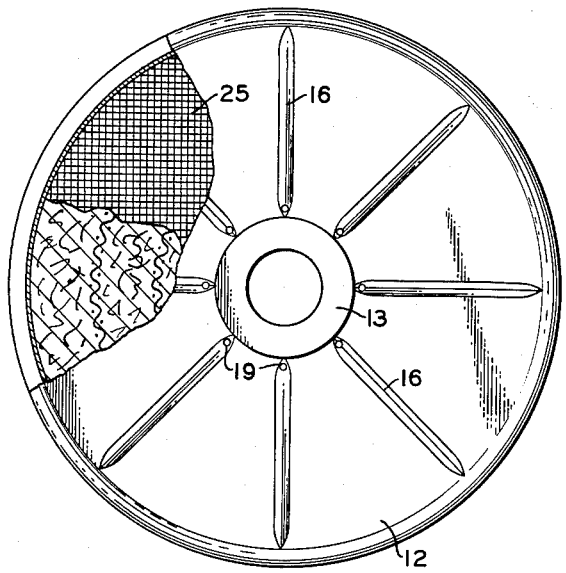
FIG. 4 is a bottom view with portions broken away of the cartridge of FIG. 1.

Referring first to FIGS. 1 to 4, my invention comprises a thin cylindrical metal casing 10 to whose upper and lower ends are sealed, as by crimping or soldering, an upper cover 11 and a lower cover 12 preferably stamped from thin sheet metal. At its center each cover has a cylindrical projection 13 within which is seated a centering and sealing gasket or washer 14 of cork, leather or like material, these gaskets abutting the ends of a central cylindrical tube 15 which is thus held concentric with casing 10. The gaskets 14 thus seal the joints between the ends of tube 15 and the covers 11—12. Bottom cover 12 has a set of narrow radially extending depressions 16 pressed therein which provide a plurality of radially extending passages 17 adapted to convey liquid radially outward along the bottom of a filter 18, the liquid to be filtered entering through a set of small holes 19 made through cover 12 preferably near projection 13. However for some installations holes 19 may be made further out along depressions 16. Upper cover 12 has radially extending projections 20 similar to depressions 16 in cover 12 to provide a set of radial passages 21 which convey the filtered liquid in toward two or more holes 22 drilled through tube 15 near the top thereof. A circular wire screen 23 surrounds the top of tube 15 and rests against the bottom face of cover 11, the screen near its center seating against the upper end of a conical shaped metal ring 24 whose lower end contacts the outer face of tube 15 just below the holes 22. A circular wire screen 25 is seated against the bottom of filter 18 and the top of cover 12 but this screen is not essential to the operation of the filter and may be omitted, if desired. Filter 18 comprises a body 26 of fibrous material in intimate contact with tube 15 and casing 10, two cylindrical wire screens 27, 28 concentric with casing 10 being embedded in the fibers many of which extend into the meshes of the screens. Instead of being made of wire, each cylinder may be a strip of thin metal perforated with many holes or the two cylinders may be replaced by a single spiral screen of increasing radius embedded in the fibers. The fibers comprising the filter material may be cotton or a mixture of cotton and other fibers such as wood fibers, hemp, sisal, cocoanut or other material having fine fibers which can be packed close enough together to remove small particles of foreign material from the liquid passing up through filter 18. The particular fibers used will depend on the nature of the liquid to be filtered particularly its viscosity and also on the sizes of the particles of foreign material suspended in the liquid. For filtering the crankcase oil of internal combustion engines, I have found cotton waste to be excellent.

Interposed between the top of filter 18 and screen 23 is a fabric cover 29 of fine mesh which, as shown, has cylindrical edge portions which extend down a suitable distance along tube 15 and casing 10. I have found that muslin of from 56—56 weave to 80—80 weave (threads per inch) provides a cover which will effectively stop any particles of foreign material which have passed up through filter 18 due to any possible malfunctioning thereof.

In operation the liquid to be filtered is passed under pressure into the bottom of the cartridge through holes 19, the radial passages 17 serving to convey it outward until it entirely covers the bottom of filter 18. The meshes of screen 25 also assist the flow of the liquid in the space under filter 18. Screen 25 also serves, when cover 12 is being attached to the end of casing 10, to prevent any loose strands of cotton hanging from the filter from getting between the cover and casing and thus possibly preventing a tight seal between these members. The liquid travels slowly up through filter 18, its flow tending to move the fibers composing the filter up and pack them together into a dense mass which would increase substantially the resistance to the flow. The presence of screens 27, 28 serves to support the fibers in a fixed position and prevents such upward movement and packing together of the fibers. Also the cylindrical passages formed by the meshes of screens 27, 28 assist the upward flow. Upper screen 23 prevents the fabric cover 29 and fibers at the upper end of filter 18 from being pushed up into the radial passages 21 and against top cover 11 which would prevent the free passage of liquid inward along the top of filter 18 toward discharge cone 24. The filtered liquid issuing through cover 29 passes inward through the clear space provided by the meshes of wire screen 23 and radial passages 21 and is discharged into cone 24 which guides it into outlet holes 22 of the cartridge.

Figure 5:
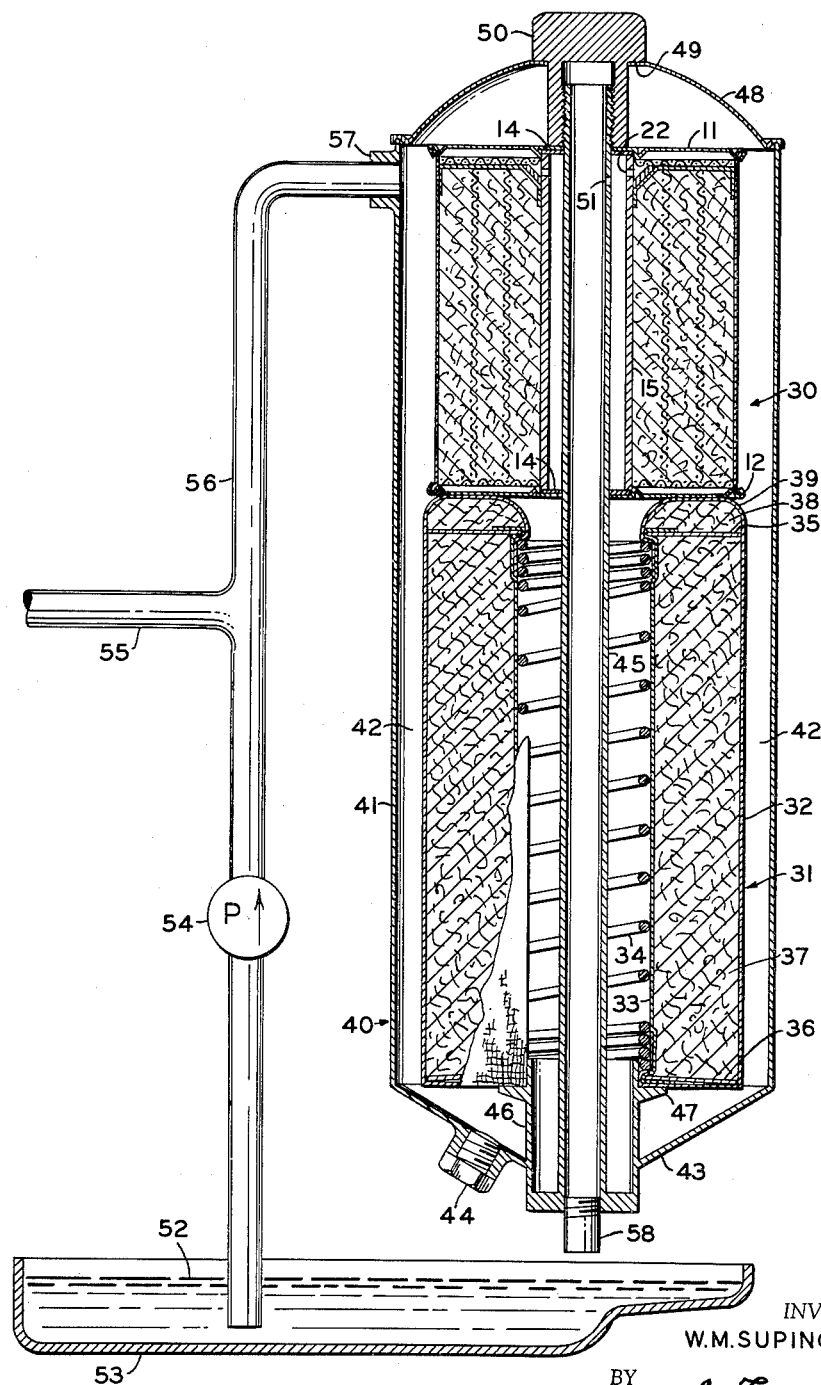
FIG. 5 is a view partly in section and partly diagrammatic of a filter system embodying the invention.
Figure 6:
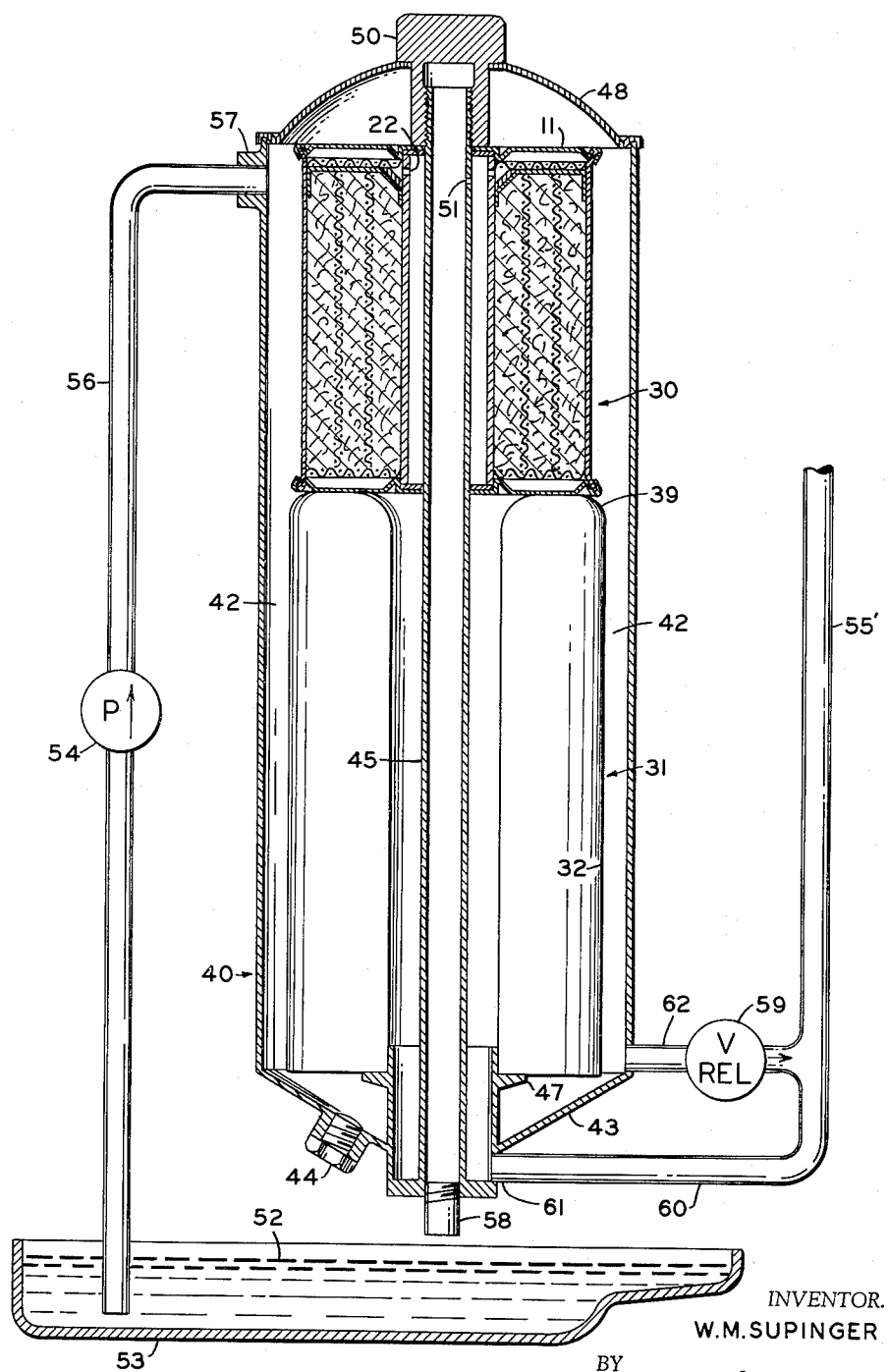
FIG. 6 is a view partly in section and partly diagrammatic of a modified form of filter system.

The cartridge described has utility in many types of filter systems and two uses for it are disclosed in FIGS. 5 and 6. Referring to FIG. 5 a filter cartridge 30 of the type above described is mounted on and supported by a filter assembly 31 of the construction disclosed in my U.S. Patent No. 2,703,650 of March 8, 1955. Filter 31 comprises an outer cylindrical fabric cover 32 and an inner cylindrical fabric sleeve 33 which engages the turns of a long compression spring 34. A circular metal ring 35 is embedded in the top of the filter and a similar ring 36 in the bottom, cover 32 and sleeve 33 being interlocked with rings 35, 36 by engagement of folded overlapping portions thereof between the opposite ends of spring 34 and said rings as more fully described in my above patent. The annular space between sleeve 33 and cover 32 is filled with filter material 37 and a body of the same material fills the space between ring 35 and the top portion 39 of cover 32 which presses against the bottom cover 12 of cartridge 30. Cartridge 30 is thus supported by filter 31.

Cartridge 30 and filter 31 are enclosed in a sealed housing 40 whose cylindrical vertical wall 41 is of substantially larger diameter diameter than that of cartridges 30 and 31 to provide a clear annular passage 42 for the flow of liquid around the cartridges. Housing 40 has a conical shaped base 43 in which sediment can gradually collect and be withdrawn at intervals by the removal of a threaded drain plug 44. Base 43 has a long upstanding outlet pipe 45 and surrounding sleeve 46 having an integral projecting flange 47 on which the base of filter 31 rests, so that flange 47 supports the weight of filter 31 and also cartridge 30. The top of housing 40 has a rounded cover 48 which is hermetically secured to the top of cylindrical wall 41. The top of pipe 45 is exteriorly threaded to receive a headed nut 50 the bottom face 49 of which forms a sealed joint with cover 48. As shown, the lower end of nut 50 bears against the top cover 11 of cartridge 30. From the construction described it will be clear that spring 34 keeps a substantial area of the top portion of filter 31 pressed firmly against the bottom cover 12 of cartridge 30. Below the level of holes 22 in tube 15, pipe 45 is provided with one or more holes 51 to conduct the filtered liquid into the pipe. It will be noted that sealing washers 14 engage the outer face of pipe 45 to form sealed joints therewith and that these washers, together with cover projections 13, serve to position the cartridge symmetrically with respect to pipe 45 and housing 40.

Lubricating oil 52 in the oil pan 53 of the crankcase of an internal combustion engine (not shown) is raised by pump 54 and portion of it conveyed via pipe 55 to the usual oil gallery of the engine which conveys it in a known manner to the engine bearings and other surfaces requiring lubrication. The remainder of the oil is conveyed via pipe 56 and inlet port 57 of housing 40 into annular passage 42. The oil flows down this passage to form an annular pool which entirely surrounds filter 31, flows radially in through the filter material 37, 38 which retains the major portion of any particles of foreign matter suspended in it. In the case of an automobile engine such particles comprise small carbon particles, metal chips, metal powder and other contaminants. The partly filtered oil next passes up in the space along spring 34, enters the inlet holes 19 of cartridge 30 and passes up through this cartridge where the filtering is completed in the manner above described. The filtered oil passes through outlet holes 22 and fills up the annular space between pipe 45 and tube 15 until it reaches the level of the hole 51 in pipe 45 when it flows down inside this pipe and is returned via a conduit 58 screwed into the bottom of pipe 45 to oil pool 52. Although conduit 58 is illustrated as being short, it will be understood that it may be several feet long and, in all installations, is long enough to return the filtered oil to pan 53. From the above it will be clear that a definite portion of the oil circulating in the system is constantly being passed through filters 31 and 30 in succession to be purged of particles of foreign material. After the oil passing through pipe 55 has lubricated the desired parts, it is returned via a conduit (not shown) to oil pool 52 for re-use.

FIG. 6 shows a lubrication system generally similar to that of FIG. 5 and in which corresponding parts are designated by the same reference numbers, the construction of housing 40 and its contained filters 30, 31 being the same as those described in connection with FIG. 5. In this case, however, pipe 55′ which conveys the oil to the oil gallery is not connected to pipe 56 but to the outlet of a pressure relief valve 59 and also to a pipe 60 the end 61 of which connects into conical base 43. The inlet of relief valve 59 is connected to the lower end of housing 40 by pipe 62.

When starting the engine the pool of oil 52 is cold and the oil is raised by pump 54 and discharged into inlet port 57 of housing 40. The cold oil passes down passage 42 and starts to flow through filter 31 which offers enough resistance to the oil flow to cause the pressure to build up enough to open relief valve 59 with the result that while a portion of the oil flow is passing through filter 31 and up through cartridge 30 for filtration, the major portion is passing through valve 59 and pipe 55′ to the oil gallery and engine (not shown) where it becomes heated and is returned via a conduit (not shown) to pool 52. As the oil in pool 52 gradually becomes heated its viscosity decreases also the resistance of filter 31 decreases and more of the oil passes therethrough with the result that relief valve 59 soon closes. Much of the oil which has passed through filter 31 and been filtered thereby now passes through pipes 60 and 55′ to the oil gallery for lubricating the engine. The balance passes up through cartridge 30 which completes the filtering and is returned in the manner above described to conduit 58 and oil pool 52. Thus while the engine is heating up, as soon as the viscosity of the oil decreases due to its heating and the hot oil is passing freely through filter 31, relief valve 59 closes and thereafter only oil which has passed radially inward through filter 31 reaches the engine. If filter 31 in time becomes nearly or entirely clogged up with carbon deposit or other foreign matter and the oil pressure in passage 42 increases substantially, relief valve 59 will open and relieve the pressure. Some of the oil will then pass through pipe 55' to the engine, the balance will pass through pipe 60 and up the annular passage surrounding tube 45 into cartridge 30 where it will be filtered and then returned to pool 52.

While the operation of the filter systems of FIGS. 5 and 6 has been described in connection with the filtering of engine lubricating oil, it will be understood that they may be used for the filtering of many other liquids containing large or small particles of foreign material which must be removed.

Having described my invention, what I claim and desire to secure by Letters Patent is:

1. A removable filter cartridge for removing from a body of oil passing vertically upwards therethrough small discrete particles of foreign matter suspended in the oil, the cartridge comprising a vertical cylindrical imperforate metal casing whose length is substantially greater than its diameter; a cylindrical metal outlet tube disposed within said casing and concentric therewith, said outlet tube having a diameter substantially less than that of said casing, the upper end of said tube having small outlet holes therethrough and the remainder of the tube being imperforate; top and bottom sheet metal covers having their outer peripheral edges in contact with and hermetically sealed to the ends of said casing, the middle portion of each cover being bent out to provide a cylindrical projection having a large central hole therethrough; a pair of annular sealing washers in contact with the annular end faces of said outlet tube and the inner faces of said cylindrical projections, each of said washers having a central circular exposed face which is free to abut against a cylindrical pipe capable of being passed through said washers and covers, said central hole in said top cover being the sole opening therethrough; a cylindrical body of fibrous filter material filling the major portion of the space between said covers, said filter material being under compression and having a large number of spaced apart portions in contact with and pressing outward against said casing and a large number of spaced apart portions in contact with and pressing inward against the outer face of said outlet tube; said bottom cover having a plurality of long radially extending narrow depressed portions which provide radial oil conveying passages and said depressed portions having a plurality of small holes therethrough which convey unfiltered oil up into said radial passages; said outlet holes through said outlet tube being adapted to convey filtered oil which has passed vertically upwards through said filter material into the upper end of said outlet tube.

2. A removable filter cartridge for removing from a body of oil passing vertically upward therethrough small discrete particles of foreign matter suspended in the oil, the cartridge comprising a vertical cylindrical imperforate thin metal casing whose length is substantially greater than its diameter; a cylindrical metal outlet tube disposed within said casing and concentric therewith, said outlet tube having a diameter substantially less than that of said casing, the upper end of said tube having small outlet holes therethrough and the remainder of the tube being imperforate; top and bottom sheet metal covers having their outer peripheral edges in contact with and hermetically sealed to the ends of said casing, the middle portion of each cover being bent out to provide a cylindrical projection having a large central hole therethrough, said top cover being bent up from a region adjacent its cylindrical projection to a region adjacent said casing to form a plurality of long narrow radially extending oil conveying passages within the cartridge and said bottom cover having a plurality of long radially extending narrow depressed portions which provide radial oil conveying passages and said depressed portions of the bottom cover having a plurality of small holes therethrough which convey unfiltered oil up into said radial passages; a pair of annular sealing washers in contact with the annular end faces of said outlet tube and the inner faces of said cylindrical projections on the covers, each of said sealing washers having a central circular exposed face which is free to abut against a cylindrical pipe capable of being passed through and washers and covers, said central hole in said top cover being the sole opening therethrough; a cylindrical body of fibrous filter material filling the major portion of the space between said covers, said filter material being under compression and having a large number of spaced apart portions in contact with and pressing outward against said casing and a large number of spaced apart portions in contact with and pressing inward against the outer face of said outlet tube; a single piece of fine mesh fabric having a flat annular portion resting on top of said body of filter material and inner and outer depending cylindrical portions, said inner cylindrical portion being in contact for a substantial vertical distance with the outer cylindrical face of said outlet tube and said outer cylindrical portion being in contact for a substantial vertical distance with the inner face of said cylindrical casing; a circular wire screen interposed between and in contact with the flat annular portion of said piece of fabric and said top cover; said outlet holes through said outlet tube being adapted to convey filtered oil which has passed vertically up through said body of filter material and said piece of fabric into the upper end of said outlet tube.

3. A removable filter cartridge as claimed in claim 2, in which a conical shaped ring of impervious material surrounds the upper portion of said outlet tube, the small end of said ring being in contact with the outer face of said outlet tube at a level slightly below the said outlet holes therethrough, said piece of fabric having a sloping portion in contact with the outer face of said ring.

4. A filter cartridge as claimed in claim 2, in which two separate inner and outer cylinders composed of wire mesh extend vertically through said body of filter material, the distance between said cylinders being substantially equal to that between said outlet tube and inner cylinder and also to that between said outer cylinder and said metal casing, a great many of the fibers of said filter material being under compression and extending into the meshes of said inner and outer wire cylinders.

References Cited in the file of this patent

UNITED STATES PATENTS

| 368,629 | Treban | Aug. 23, 1887 |
|---|---|---|
| 1,761,963 | Babitch | June 3, 1930 |
| 2,068,263 | Burhans | Jan. 19, 1937 |
| 2,253,684 | Burckhalter | Aug. 26, 1941 |
| 2,284,447 | Redner | May 26, 1942 |
| 2,321,985 | Briggs | June 15, 1943 |
| 2,394,895 | Burhans | Feb. 12, 1946 |
| 2,463,929 | West | Mar. 8, 1949 |
| 2,507,818 | Sager | May 16, 1950 |
| 2,529,398 | Krieck | Nov. 7, 1950 |
| 2,742,160 | Fogwell | Apr. 17, 1952 |
| 2,854,143 | Novak | Sept. 30, 1958 |

UNITED STATES PATENT OFFICE
CERTIFICATE OF CORRECTION

Patent No. 2,988,225  June 13, 1961

William M. Supinger

It is hereby certified that error appears in the above numbered patent requiring correction and that the said Letters Patent should read as corrected below.

Column 3, line 59, strike out "diameter", second occurrence; column 6, line 16, for "and", first occurrence, read -- said --.

Signed and sealed this 7th day of November 1961.

(SEAL)
Attest:

ERNEST W. SWIDER
Attesting Officer

DAVID L. LADD
Commissioner of Patents

USCOMM-DC